(12) United States Patent
Ekeroth

(10) Patent No.: US 9,308,520 B2
(45) Date of Patent: Apr. 12, 2016

(54) SILICA BASED MATERIAL

(75) Inventor: Johan Ekeroth, Göteborg (SE)

(73) Assignee: AKZO NOBEL N.V., Arnhem (NL)

( * ) Notice: Subject to any disclaimer, the term of this patent is extended or adjusted under 35 U.S.C. 154(b) by 1227 days.

(21) Appl. No.: 11/638,167

(22) Filed: Dec. 13, 2006

(65) Prior Publication Data

US 2007/0187313 A1  Aug. 16, 2007

Related U.S. Application Data

(60) Provisional application No. 60/750,950, filed on Dec. 16, 2005.

(51) Int. Cl.
*B01J 20/28* (2006.01)
*B01J 20/286* (2006.01)
*B01J 20/10* (2006.01)
(Continued)

(52) U.S. Cl.
CPC ........... *B01J 20/286* (2013.01); *B01J 20/103* (2013.01); *B01J 20/28004* (2013.01); *B01J 20/287* (2013.01); *B01J 20/28016* (2013.01); *B01J 20/28042* (2013.01); *B01J 20/28061* (2013.01); *B01J 20/28069* (2013.01); *B01J 20/28078* (2013.01); *B01J 20/3204* (2013.01); *B01J 20/3227* (2013.01); *B01J 20/3246* (2013.01); *B01J 2220/54* (2013.01); *B01J 2220/58* (2013.01); *B01J 2220/82* (2013.01)

(58) Field of Classification Search
CPC ............. B01J 20/103; B01J 20/28016; B01J 20/28061; B01J 20/28069; B01J 20/287; B01J 20/286; B01J 20/3204; B01J 20/3227; B01J 20/28042; B01J 20/28078; B01J 20/3246; B01J 20/28004; B01J 2220/54; B01J 2220/58; B01J 2220/82
USPC ............................ 210/198.2, 635, 656, 502.1
See application file for complete search history.

(56) References Cited

U.S. PATENT DOCUMENTS

| 3,722,181 A | 3/1973 | Kirkland et al. .................. 55/67 |
| 3,795,313 A | 3/1974 | Kirkland et al. .......... 210/198 C |
| 3,953,487 A | 4/1976 | Kratel et al. |

(Continued)

FOREIGN PATENT DOCUMENTS

| EP | 0 903 578 A2 | 3/1999 | ............. G01N 30/00 |
| EP | 0 903 578 A3 | 3/1999 | ............. G01N 30/00 |

(Continued)

OTHER PUBLICATIONS

Synder Introduction to Modern Liquid Chromatography, John Wiley&Sons, New York, 1979, pp. 272-278.*

(Continued)

*Primary Examiner* — Ernest G Therkorn
(74) *Attorney, Agent, or Firm* — Alice C. Su

(57) ABSTRACT

An organo-modified silica based material to be used for making a stationary phase for liquid chromatography comprising a part which is unmodified silica, and a part which is silica comprising organic groups bonded to the silica. A method for preparing an organo-modified silica based material comprising mixing in an aqueous medium a silica based material and an organosilane compound, and reacting the mixture. A stationary phase separation material prepared by functionalizing the organo-modified silica based material is also disclosed.

18 Claims, 2 Drawing Sheets

(51) Int. Cl.
*B01J 20/287* (2006.01)
*B01J 20/32* (2006.01)

(56) References Cited

U.S. PATENT DOCUMENTS

| | | | |
|---|---|---|---|
| 4,017,528 A | 4/1977 | Unger et al. | 260/448.8 R |
| 4,043,905 A * | 8/1977 | Novotny et al. | 210/198.2 |
| 4,298,500 A | 11/1981 | Abbott | |
| 4,724,207 A | 2/1988 | Hou et al. | 435/180 |
| 4,775,520 A | 10/1988 | Unger et al. | 423/335 |
| 4,778,909 A | 10/1988 | Karger et al. | |
| 5,374,755 A * | 12/1994 | Neue et al. | 556/400 |
| 5,522,994 A * | 6/1996 | Frechet et al. | 210/635 |
| 5,559,039 A * | 9/1996 | Williams | 436/161 |
| 5,561,097 A * | 10/1996 | Gleason et al. | 502/402 |
| 5,637,135 A | 6/1997 | Ottenstein et al. | 96/101 |
| 5,686,054 A | 11/1997 | Barthel et al. | 423/335 |
| 6,132,649 A | 10/2000 | Cauda et al. | |
| 6,183,867 B1 | 2/2001 | Barthel et al. | |
| 6,271,292 B1 | 8/2001 | Mager et al. | 524/261 |
| 6,290,853 B1 * | 9/2001 | Allmer et al. | 210/635 |
| 6,313,219 B1 | 11/2001 | Taylor-Smith | 524/853 |
| 6,664,305 B2 * | 12/2003 | Jungbauer et al. | 521/64 |
| 6,686,035 B2 | 2/2004 | Jiang et al. | 428/304.4 |
| 7,125,488 B2 * | 10/2006 | Li | 210/198.2 |
| 2002/0147293 A1 * | 10/2002 | O'Gara | 528/10 |
| 2004/0048067 A1 * | 3/2004 | O'Gara | 428/405 |
| 2005/0178730 A1 | 8/2005 | Li | 210/656 |
| 2005/0191503 A1 | 9/2005 | Jones | 428/447 |
| 2006/0070937 A1 | 4/2006 | Rustamov et al. | 210/198.2 |
| 2007/0125711 A1 * | 6/2007 | Bergstrom et al. | 210/656 |

FOREIGN PATENT DOCUMENTS

| | | | | |
|---|---|---|---|---|
| WO | WO 91/04095 A1 | 4/1991 | | B01J 20/02 |
| WO | WO 99/36479 A1 | 7/1999 | | |
| WO | WO 00/71246 | 11/2000 | | B01J 20/32 |
| WO | WO 2004/071615 A2 | 8/2004 | | |
| WO | WO 2004/071615 A3 | 8/2004 | | |
| WO | WO 2005/042131 A1 * | 12/2005 | | |

OTHER PUBLICATIONS

Marshall, D. B. et al., "Variable Reactivity in the Chemical Modification of Silica—Effects of Initial Deactivation on High-Performance Liquid Chromatographic Performance," Journal of Chromatography, vol. 361 (1986) pp. 71-82.

Albert, K., "NMR investigations of stationary phases," J. Sep. Sci., vol. 26 (2003), pp. 215-224.

Scott, R.P.W., "Silica Gel and Bonded Phases—Their Production, Properties and Use in LC," John Wiley & Sons Ltd., England, UK (1993) pp. 159-160.

Sander, L. C. et al., "Synthesis and Characterization of Polymeric $C_{18}$ Stationary Phases for Liquid Chromatography," Anal. Chem., vol. 56 (1984) pp. 504-510.

Kirkland, J.J., "Development of some stationary phases for reversed-phase high-performance liquid chromatography," Journal of Chromatography A, vol. 1060 (2004), pp. 9-21.

Office Action dated Mar. 24, 2010 for corresponding Canadian Application No. 2,633,444.

* cited by examiner

SILICA BASED MATERIAL

FIELD OF THE INVENTION

The invention relates to an organo-modified silica based material and a method of preparing an organo-modified silica based material. It also relates to the use of the organo-modified silica based material for preparing a stationary phase separation material, a method of preparing a stationary phase separation material, a stationary phase separation material, and the use of the stationary phase separation material in chromatography separation methods.

BACKGROUND OF THE INVENTION

Chromatographic stationary phase separation materials used in liquid chromatography are commonly based on a porous carrier of silica onto which a functionalisation has been made in order to achieve the desired separation characteristics for a certain analyte to be separated. Common types of functionalisation are the preparation of hydrophobic stationary phases, e.g. a C18-phase, in which usually octadecylsilane is used as a functionalising agent and reacted with silanol groups of porous silica. However, it is difficult to have all silanol groups reacting with the functionalising agent, mainly due to steric hindrance. Remaining silanol groups make the material very susceptible to hydrolysis, due to their polar nature. Therefore, end-capping of remaining silanol groups with, e.g. trimethylchlorosilane, is usually made. However, stationary phase separation materials based on silica, such as a conventional end-capped C18-phase, are still chemically rather unstable at high pH due to still remaining silanol groups, as well as to the fact that the end-capped silanol groups are still susceptible to hydrolysis.

The retention time and also capacity, the maximum amount of analyte applied without introducing competitive interaction, for a certain analyte depend on the actual surface coverage of the functionalisation. Moreover, the optimum surface coverage is a function of both the analyte and the actual surface functionalisation. The surface coverage obtained under normally applied procedures, which is a surface bonding on bare, fully rehydroxylated silica, is typically higher than optimum for all analytes.

A lowering of the surface coverage of functional groups on silica has according to one method according to the state of the art been achieved by, instead of using an excess, using a deficit of the functionalising agent, e.g. an organosilane. However, when using a deficit of functionalising agent the level of surface coverage is difficult to reproduce, due to, e.g., remaining moisture and exact determination of the chemically available surface. Also, hydrophobic organosilane molecules often tend to form clusters, which lead to "island" formation and thus an uneven distribution of the organosilane on the silica surface.

Furthermore, when using a deficit of the organosilane used for modification there will be remaining silanol groups present which are usually blocked with an end-capping agent such as a lower alkyl organo silane, e.g. trimethylchlorosilane. However, as already described, end-capped silanol groups are still susceptible to hydrolysis which means that the chemical stability will be even lower than, e.g., conventional C18-phases at extreme pH-values (<2 and >10). Also, end-capping is difficult to make complete which means that there will usually be remaining silanol groups present which are very susceptible to hydrolysis. Remaining silanol groups also interact unfavourably with analytes, especially basic analytes.

Alternatively, a lowering of the surface coverage of functional groups on silica can be made by end-capping some of the silanol groups prior to functionalisation as described in Marshall et al., J. of Chrom., 361 (1986) 71-92. Also in this case, there are problems with an even lower chemical stability than conventional C18-phases due to the increased number of end-capped silanol groups.

Several attempts have been made to provide stationary phase separation materials which are chemically stable. U.S. Pat. No. 4,017,528 A discloses preparation of a porous silicon dioxide bearing organic groups which are part both of the skeleton structure and the surface. U.S. Pat. No. 6,686,035 B2 discloses a porous inorganic/organic hybrid material particle comprising a polyorganoalkoxysiloxane through the whole particle. However, both these types of hybrid particles are much less mechanically stable than pure silica particles. US. 2005/0191503 A1 discloses a method of preparing a chemically stable separation material wherein a polycarbosilane layer is covalently bonded to a silica surface. U.S. Pat. No. 3,722,181 A discloses a polymeric stationary phase chemically bonded to a substrate of silica.

There is a need for chemically stable silica based stationary phase separation materials which are mechanically stable.

There is, furthermore, a need for a method of reducing the number of remaining silanol groups on a silica surface of a stationary phase separation material after functionalisation in order to increase the chemical stability of the stationary phase separation material and minimise unfavourable interaction with analytes.

There is also a need for a method of reducing the surface coverage of functional groups in a controlled way having high reproducibility.

There is also a need for a silica based stationary phase separation material wherein the number of remaining silanol groups on the silica surface is low, thereby increasing the stability of the stationary phase separation material and minimising unfavourable interaction with analytes.

There is also a need for a chemically stable silica based stationary phase material, which preserves all the performance benefits of bare silica functionalised with organosilanes, i.e., a common silica based functionalised stationary phase separation material.

There is therefore an object of the present invention to provide a silica based material which has high chemical and mechanical stability and onto which functionalisation can be made in a controlled way. There is also an object of the present invention to provide a stationary phase separation material for chromatography which has high chemical and mechanical stability, and which has high loadability. There is also an objective of the present invention to provide a stationary phase separation material which has all the performance benefits of state of the art surface functionalised silica based on pure silica at the same time the chemical stability is higher.

SUMMARY OF THE INVENTION

It has surprisingly been found that the objects of the present invention are achieved by a method of preparing an organo-modified silica based material comprising providing a reaction mixture by mixing in an aqueous medium comprising from about 25 to about 100 weight % water, a silica based material (S) and one or more organosilane compounds (A), and reacting the mixture. The reaction mixture is suitably provided by, in any order, adding to, and at least partially dissolving in, an aqueous medium comprising from about 25 to about 100 weight % water, one or more organosilane compounds A, and, adding a silica based material (S).

In another aspect, the invention is directed to an organo-modified silica based material including a part which is unmodified silica, and a part which is silica that includes organic groups bonded to the silica.

In another aspect, the invention is directed to a stationary phase separation material including an organo-modified silica based material including a part which is unmodified silica, and a part which is silica that includes organic groups bonded to the silica, which further includes a surface-functionalisation in the form of one or more functional groups.

In yet another aspect, the invention is directed to a method of preparing a stationary phase separation material comprising reacting the organo-modified silica based material with a functionalizing agent that includes a functional group.

DETAILED DESCRIPTION OF THE INVENTION

Figure 1:
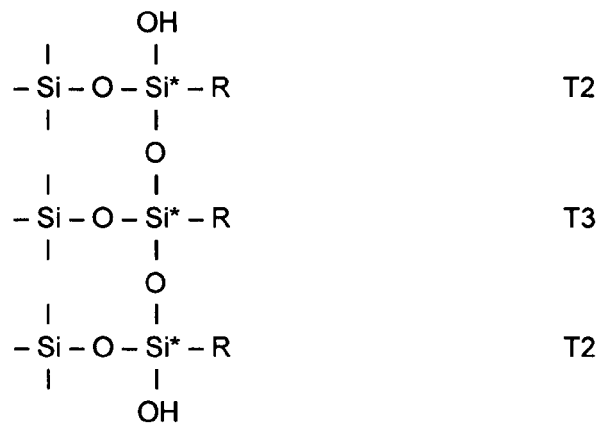
FIG. 1 is a chemical formula showing silicon having a T2 structure and a T3 structure.

The "aqueous medium" comprises suitably at least about 30 weight % water, also suitably from about 30 to about 100 weight, preferably at least about 40 weight % water, also preferably from about 40 to about 100 weight %, more preferably at least about 60 weight % water, also more preferably from about 60 to about 100 weight %, most preferably at least about 80 weight % water, also most preferably from about 80 to about 100 weight %.

The aqueous medium suitably comprises less than about 10 weight % of any organic solvent not miscible with water, preferably less than about 1 weight %, most preferably the aqueous medium is free from any organic solvents not miscible with water.

By "silica based material (S)" is herein meant silica or a material comprising silica. Preferably the silica based material (S) is silica.

In one embodiment of the present invention, the one or more organosilane compounds (A) are suitably dissolved in an aqueous medium comprising an organic solvent, miscible with water, in an amount of from about 1 to about 75 weight %, preferably from about 5 to about 60 weight %, most preferably from about 10 to about 50 weight %. The organic solvent is suitably an alcohol, which is preferably a monohydric or a dihydric alcohol. Examples of preferred alcohols are methanol, ethanol, propanol, and isopropanol, ethylene glycol and propylene glycol. Most preferably, the alcohol is methanol or ethanol. The amount of the organic solvent in the reaction mixture may also be varied during the time the components of the reaction mixture are allowed to react. In one such embodiment, the liquid phase of the reaction mixture comprises an organic solvent in an amount within the above-specified limits and after some time of reaction, the water content is increased by addition of water, or evaporation of organic solvent, and the reaction mixture is further reacted.

The amount one or more organosilane compounds (A) added to the aqueous medium, calculated as weight % of the total reaction mixture, is suitably from about 1 to about 25 weight %, preferably from about 5 to about 15 weight %.

The amount silica based material (S) added to the aqueous medium, calculated as weight % of the total reaction mixture, is suitably from about 1 to about 50 weight %, preferably from about 3 to about 30 weight %, most preferably from about 5 to about 20 weight %.

The temperature of the reaction mixture is suitably from about 40 to about 300° C., preferably from about 50 to about 200° C., more preferably from about 75 to about 175° C., even more preferably from about 80 to about 175° C., even more preferably from about 90 to about 160° C., most preferably from about 100 to about 150° C. When needed, the reaction mixture is subjected to a pressure above atmospheric pressure in order to be able to achieve the temperatures of the reaction mixture.

The components of the reaction mixture are allowed to react for suitably at least about 1 minute, also suitably from about 1 minute to about 500 hours, preferably at least about 30 minutes, also preferably from about 30 minutes to about 300 hours, more preferably at least about 1 hour, also more preferably from about 1 hour to about 200 hours, most preferably at least about 3 hours, also most preferably from about 3 hours to about 100 hours.

In one embodiment of the method, the reaction mixture suitably comprises a base for adjusting the pH to the alkaline side. The pH in the reaction mixture is suitably from about 7.5 to about 13, preferably from about 10 to about 11.5. The choice of base is not critical. However, bases belonging to the group of ammonia and organic amines are preferred.

An acid, which can be an inorganic or an organic acid, is suitably added after the components of the reaction mixture have been allowed to react. Suitably, the acid is a mineral acid, preferably nitric acid, hydrochloric acid or sulphuric acid.

After the components of the reaction mixture have been allowed to react the mixture is suitably filtered and the silica based material is washed. As washing medium preferably water and also an organic solvent such as acetone, tetrahydrofuran, 1,4- or dioxane are used. Finally, the organo-modified silica based material is dried, suitably at a temperature of from about 50° C. to about 140° C.

In one embodiment, the method comprises a temperature increase during the preparation of the organo-modified silica based material. The temperature of the reaction mixture is suitably increased from a temperature TEMP1 to a higher temperature TEMP2. Both temperature TEMP1 and temperature TEMP2 are within the ranges of the temperature of the reaction mixture already specified.

In one embodiment, the method comprises a first step wherein the reaction mixture of silica based material (S) and one or more organosilane compounds (A) is reacted at a temperature TEMP1, followed by a second step comprising subjecting the reacted silica based material produced in the first step to a temperature TEMP2, wherein TEMP2>TEMP1. One alternative comprises washing and drying the reacted silica based material produced in the first step before mixing it with an aqueous medium before exposure to temperature TEMP2 in the second step. Another alternative comprises keeping the reacted silica based material produced in the first step in the solution in which it has been reacted and increase the temperature to TEMP2.

A further alternative is to use a silica based material comprising an organic surface modification as a starting material and subject the material to the conditions according to the second step in the embodiment described. The silica based material comprising an organic surface modification may be reacted with one or more organosilane compounds (A), thereby including further organosilane moieties into the silica based material. In such a case, this reaction step is suitably made before subjecting the material to the conditions according to the second step in the embodiment described. The silica based material comprising an organic surface modification suitably comprises a surface modification comprising organic groups being $C_1$-$C_4$ alkyl, $C_2$-$C_4$ alkenyl, or $C_2$-$C_4$ alkynyl.

After the reaction between the one or more organosilane compounds (A) and the silica based material (S), the organo-modified silica based material may again be reacted with one or more further organosilane compounds (A), which can be the same or different from the ones used before, thereby including further organosilane moieties into the organo-modified silica based material.

Temperature TEMP1 is suitably within the range of from about 50 to about 100° C., preferably from about 75 to about 100° C., most preferably from about 90 to about 100° C. Temperature TEMP2 is suitably within the range of from about 100 to about 200° C., preferably from about 110 to about 150° C., most preferably from about 120 to about 140° C.

In the second step, the liquid phase of the reaction mixture suitably comprises from about 80 to about 100 weight % water, preferably from about 90 to about 100 weight %, most preferably from about 95 to about 100 weight %.

In one embodiment, the content of water in the liquid phase of the reaction mixture is increased when increasing the temperature from temperature TEMP1 to temperature TEMP2. The increase in water content is suitably made by addition of water or by evaporation of the organic solvent miscible with water that may be present in the reaction mixture.

The reaction mixture is subjected to the temperature TEMP1 for suitably at least about 1 minute, also suitably from about 1 minute to about 500 hours, preferably at least about 30 minutes, also preferably from about 30 minutes to about 300 hours, more preferably at least about 1 hour, also more preferably from about 1 hour to about 200 hours, most preferably at least about 3 hours, also most preferably from about 3 hours to about 100 hours.

The organo-modified silica based material produced in the first step is subjected to the temperature TEMP2 for suitably at least about 1 minute, also suitably from about 1 minute to about 500 hours, preferably at least about 30 minutes, also preferably from about 30 minutes to about 300 hours, more preferably at least about 1 hour, also more preferably from about 1 hour to about 200 hours, most preferably at least about 3 hours, also most preferably from about 3 hours to about 100 hours.

The one or more organosilane compounds A suitably comprises a moiety of the general formula $(R_1)_{3-n}(X)_n SiR_2$—, wherein $R_1$ is $C_1$-$C_4$ alkyl, $C_2$-$C_4$ alkenyl, or $C_2$-$C_4$ alkynyl, preferably $C_1$-$C_2$ alkyl, $R_2$ is methylene, and X is a leaving group, n=2 or 3. The one or more organosilane compounds A are suitably of the general formula $(R_1)_{3-n}(X)_n SiR_3$, wherein $R_1$ is $C_1$-$C_4$ alkyl, $C_2$-$C_4$ alkenyl, or $C_2$-$C_4$ alkynyl, preferably $C_1$-$C_2$ alkyl, $R_3$ is $C_1$-$C_8$ alkyl, $C_2$-$C_8$ alkenyl, or $C_2$-$C_8$ alkynyl, preferably $C_1$-$C_3$ alkyl, most preferably $C_1$-$C_2$ alkyl and X is a leaving group, n=2 or 3. Alternatively, the one or more organosilane compounds A are suitably of the general formula: $(R_4)_{3-n}(X)_n SiR_6 Si(R_5)_{3-m}(Y)_m$, wherein $R_4$ and $R_5$ are independently from each other $C_1$-$C_4$ alkyl, $C_2$-$C_4$ alkenyl, or $C_2$-$C_4$ alkynyl, preferably $C_1$-$C_2$ alkyl, $R_6$ is $C_1$-$C_8$ alkylene, $C_2$-$C_8$ alkenylene, or $C_2$-$C_8$ alkynylene, preferably $C_2$-$C_5$ alkylene, $C_2$-$C_3$ alkenylene, or $C_2$-$C_8$ alkynylene most preferably $C_1$-$C_3$ alkylene or $C_2$-$C_3$ alkenylene, and X and Y are leaving groups, n=2 or 3, m=2 or 3.

Examples of preferred $R_1$ groups are methyl, ethyl, propyl, 2-propyl, butyl, 2-butyl, ethenyl, 2-propenyl, 1-propenyl, 1-(1-butenyl), 1-(2-butenyl), 4(1-butenyl), 2-(1-butenyl), 2-(2-butenyl), 3-(1-butenyl), ethynyl, 1-propynyl, 3-propynyl, 1-(1-butynyl), 1-(2-butynyl), 4-(1-2-butynyl), and 3-butynyl.

Examples of preferred $R_3$ groups are methyl, ethyl, propyl, 2-propyl, butyl, 2-butyl, ethenyl, 2-propenyl, 1-propenyl, 1-(1-butenyl), 1-(2-butenyl), 4(1-butenyl), 2-(1-butenyl), 2-(2-butenyl), 3-(1-butenyl), ethynyl, 1-propynyl, 3-propynyl, 1-(1-butynyl), 1-(2-butynyl), 4(1-butynyl), and 3-butynyl.

Examples of preferred $R_4$ and $R_5$ groups are methyl, ethyl, propyl, 2-propyl, butyl, 2-butyl, ethenyl, 2-propenyl, 1-propenyl, 1-(1-butenyl), 1-(2-butenyl), 4(1-butenyl), 2-(1-butenyl), 2-(2-butenyl), 3-(1-butenyl), ethynyl, 1-propynyl, 3-propynyl, 1-(1-butynyl), 1-(2-butynyl), 4-(1-butynyl), and 3-butynyl.

Examples of preferred $R_6$ groups are methylene, ethylene, propylene, 2-propylene, butylene, 2-butylene, ethenylene, 2-propenylene, 1-propenylene, 1-(1-butenylene), 1-(2-butenylene), 4(1-butenylene), 2-(1-butenylene), 2-(2-butenylene), 3-(1-butenylene), 1-propynylene, 3-propynylene, 1-(1-butynylene), 1-(2-butynylene), 4-(1-butynylene), and 3-butynylene.

For all organosilane compounds A, all types of leaving groups X and Y can be used but they are suitably a halogen, alkoxy or alkylamine, preferably chlorine, methoxy or ethoxy.

Examples of suitable organosilane compounds A include monoalkyltrialkoxy silanes such as methyltrimethoxysilane, ethyltrimethoxysilane, methyltriethoxysilane and ethyltriethoxysilane, dialkyldialkoxysilanes such as dimethyldimethoxysilane, diethyldimethoxysilane, dimethyidiethoxysilane and diethyldiethoxysilane, monoalkyltrihalogenosilanes such as methyltrichlorosilane, ethyltrichlorosilane and dialkyldihaloenosilanes such as dimethyldichlorosilane and diethyldichlorosilane. Further examples of suitable organosilane compounds A include Bis(trimethoxysilyl)methane, Bis(triethoxysilyl)methane, Bis(trimethoxysilyl)ethane, Bis(triethoxysilyl)ethane, Bis(trimethoxysilyl)propane, Bis(triethoxysilyl)propane, Bis(triethoxysilyl)butane, Bis(triethoxysilyl)butane, Bis(trihalogensilyl)methane, Bis(trihalogensilyl)ethane, Bis(trihalogen)propane, Bis(trihalogensilyl)butane. Preferably, a methyltrialkoxysilane, a dimethyldialkoxysilane, an ethyltrialkoxysilane or a Bis(trialkoxysilyl)ethane is used where the alkoxy is methoxy or ethoxy.

The present invention further relates to an organo-modified silica based material obtainable by the method described above.

The present invention further relates to an organo-modified silica based material comprising a part which is unmodified silica, and a part which is silica comprising organic groups bonded to the silica, the organic groups suitably belong to the group of alkyl-, alkenyl-, alkynyl-, alkylene-, alkenylene- or alkynylene groups.

The organo-modified silica based material suitably comprises organic groups distributed from the surface into the silica based material in a gradually decreasing concentration.

The organo-modified silica based material suitably comprises a part which is unmodified silica, and a part comprising alkyl groups, alkenyl groups or alkynyl groups bonded to silicon atoms comprised in a —OSi≡ group and/or alkylene groups, alkenylene groups or alkynylene groups bonded to two silicon atoms which each are comprised in a —OSi≡≡ group. The alkyl groups are suitably $C_1$-$C_4$ alkyl groups, preferably $C_1$-$C_3$ alkyl groups, most preferably $C_1$-$C_2$ alkyl groups. The alkenyl groups are suitably $C_2$-$C_4$ alkenyl groups, preferably $C_2$-$C_3$ alkenyl groups. The alkynylyl groups are suitably $C_2$-$C_4$ alkynyl groups, preferably $C_2$-$C_3$ alkynyl groups. The alkylene groups are suitably $C_1$-$C_8$ alkylene groups, preferably $C_1$-$C_5$ alkylene groups, most preferably $C_1$-$C_3$ alkylene groups. The alkenylene groups are suitably $C_2$-$C_8$ alkenylene groups, preferably $C_2$-$C_5$ alkenylene groups, most preferably $C_2$-$C_3$ alkenylene groups. The alkynylene groups are suitably $C_2$-$C_8$ alkynylene groups, preferably $C_2$-$C_5$ alkynylene groups, most preferably $C_2$-$C_3$ alkynylene groups.

Examples of preferred alkyl-, alkenyl- or alkynyl groups are methyl, ethyl, propyl, 2-propyl, butyl, 2-butyl, ethenyl, 2-propenyl, 1-propenyl, 1-(1-butenyl), 1-(2-butenyl), 4(1butenyl), 2-(1-butenyl), 2-(2-butenyl), 3-(1-butenyl), ethynyl, 1-propynyl, 3-propynyl, 1butynyl), 1-(2-butynyl), 4-(1-butynyl), and 3-butynyl.

Examples of preferred alkylene-, alkenylene- or alkynylene groups are methylene, ethylene, propylene, 2-propylene, butylene, 2-butylene, ethenylene, 2-propenylene, 1-propenylene, 1-(1-butenylene), 1-(2-butenylene), 4(1-butenylene), 2-(1-butenylene), 2-(2-butenylene), 3-(1-butenylene), 1-propynylene, 3-propynylene, 1-(1-butynylene), 1-(2-butynylene) 4-(1-butynylene), and 3-butynylene.

The part which is the unmodified silica suitably comprises the most inner part of the organo-modified silica based material, i.e., the part most distant from a surface.

By "unmodified silica" is herein meant silica which does not comprise any organic groups bonded to the silica, i.e., the silica has not been altered by any reaction with any organic compound. Examples of organic groups are alkyl and alkylene groups. In "unmodified silica", a silicon atom is suitably bonded to at least one, preferably four, —OSi≡ groups in which the silicon atoms of the —OSi≡ groups are not further bonded to any organic group, thereby forming a domain of unmodified silica.

The silica based material (S) as well as the organo-modified silica based material is suitably in the form particles, preferably porous particles. The volume average size of the porous particles is suitably from about 0.5 to about 500 μm, preferably from about 1 to about 200 μm, most preferably from about 1.5 to about 50 μm. The particles are preferably substantially spherical. The average pore size of the porous particles is suitably from about 1 to about 5000 Å, preferably from about 10 to about 3000 Å, most preferably from about 50 to about 2000 Å.

Alternatively, the silica based material (S) and the organo-modified silica based material is suitably in the form of a monolithic material. The monolithic material suitably has a meso pore size of from about 10 to about 3000 Å, preferably from about 50 to about 2000 Å.

The pore size of the organo-modified silica based material is suitably from about 70 to about 100% of the pore size of the silica based material (S), preferably from about 80 to about 100%, most preferably from about 90 to about 100%.

The pore volume of the silica based material (S) and the organo-modified silica based material is suitably from about 0.1 to about 4 ml/g, preferably from about 0.3 to about 2 ml/g, most preferably from about 0.5 to about 1.5 ml/g.

The specific surface area (BET method) of the silica based material (S) and the organo-modified silica based material is suitably from about 1 to about 1000 $m^2$/g, preferably from about 25 to about 700 $m^2$/g. most preferably from about 50 to about 500 $m^2$/g.

The present invention also relates to a stationary phase separation material comprising the organo-modified silica based material according to the present invention and to a method of preparing the stationary phase separation material.

The stationary phase separation material suitably comprises a surface-functionalisation in the form of one or more functional groups. The one or more functional groups suitably belong to the group of diol-substituted alkyl, amino-substituted alkyl, cyanoalkyl, fluoroalkyl, phenyl, fluorophenyl, phenylalkyl and $C_1$-$C_{30}$ alkyl, preferably $C_4$-, $C_8$-, and $C_{18}$ alkyl.

Solid state silicon ($^{29}$Si) Nuclear Magnetic Resonance (NMR) spectroscopy can be used to determine the structure of a silica based material. This is a known method which is described in, e.g., Albert K., "NMR investigations of stationary phases", J. Sep. Sci. 2003, 26, 215-224. A silicon atom having an organic group attached and also two —OSi≡ groups attached to the silicon is said to have a T2 structure. A silicon atom having an organic group attached and also three —OSi≡ groups attached to the silicon is said to have a T3 structure (FIG. 1).

The organo-modified silica based material suitably has a ratio of the amount of silicon atoms having a T2 structure to the amount of silicon atoms having a T3 structure of less than about 1, also suitably from about 0 to about 1, preferably from about 0.1 to about 0.9, preferably from about 0.15 to about 0.75, most preferably from about 0.2 to about 0.6, as determined by solid state NMR spectroscopy.

The stationary phase separation material suitably has a ratio of the amount of silicon atoms having a T2 structure to the amount of silicon atoms having a T3 structure less than about 0.75, also suitably from about 0 to about 0.5, preferably less than about 0.5, also preferably from about 0 to about 0.5, most preferably less than about 0.3, also preferably from about 0 to about 0.3, as determined by solid state NMR spectroscopy.

A T1 structure would represent a silicon atom having an organic group attached and only one —OSi≡ group attached to the silicon. The T1 structure is substantially absent in the organo-modified silica based material according to the present invention and also substantially absent in the stationary phase separation material according to the present invention).

The ratio of the amount of T1 to the amount of all of (T1+T2+T3) in the organo-modified silica based material is suitably from about 0 to about 0.05, preferably from about 0 to about 0.01, most preferably from about 0 to about 0.001. The ratio of the amount of T2 to the amount of all of (T1+T2+T3) in the organo-modified silica based material, as determined by solid state NMR spectroscopy, is suitably less than about 0.40, also suitably from about 0.10 to about 0.40, preferably less than about 0.35, also preferably from about 0.15 to about 0.35. The ratio of the amount of T3 to the amount of all of (T1+T2+T3) in the organo-modified silica based material, as determined by solid state NMR spectroscopy, is suitably more than, or equal to, about 0.60, also suitably from about 0.60 to about 0.90, preferably more than about 0.65, also preferably from about 0.65 to about 0.85.

The ratio of the amount of T1 to all the amount of all of (T1+T2+T3) in the stationary phase separation material is suitably from about 0 to about 0.05, preferably from about 0 to about 0.01, most preferably from about 0 to about 0.001. The ratio of the amount of T2 to the amount of all of (T1+T2+T3) in the stationary phase separation material, as determined by solid state NMR spectroscopy, is suitably less than about 0.40, also suitably from about 0 to about 0.40, preferably less than about 0.30, also preferably from about 0 to about 0.30, most preferably less than about 0.25, also most preferably from about 0 to about 0.25. The ratio of the amount of T3 to the amount of all of (T1+T2+T3) in the stationary phase separation material, as determined by solid state NMR spectroscopy, is suitably more than, or equal to, about 0.70, also suitably from about 0.70 to about 1, preferably more than about 0.75, also preferably from about 0.75 to about 1.

Figure 2:
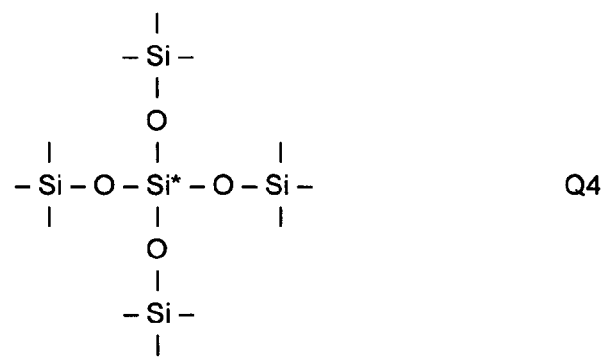
FIG. 2 is a chemical formula showing silicon having a Q4 structure.
Figure 3:
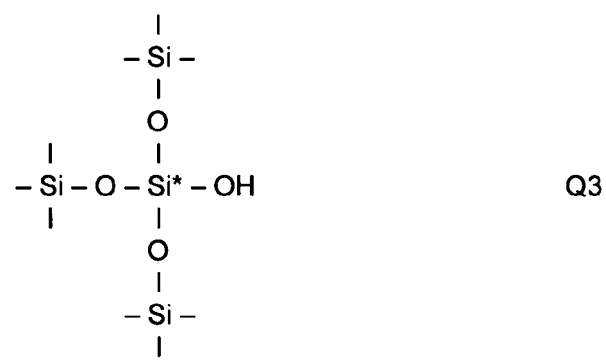
FIG. 3 is a chemical formula showing silicon having a Q3 structure.

A silicon atom having four —OSi≡ groups attached to the silicon is said to have a Q4 structure (FIG. 2). Pure silica comprises essentially Q4 silicons. A silicon atom having one hydroxyl group attached and also three —OSi≡ groups attached to the silicon is said to have a Q3 structure (FIG. 3). Q4 and Q3 structures can be analysed by solid state silicon NMR spectroscopy.

The organo-modified silica based material and the stationary phase separation material suitably comprise silicon atoms having a Q4 structure.

The surface of the organo-modified silica based material suitably comprises silicon atoms, being part of the silica based material, which do not have any organic groups bonded to them.

The ratio of the amount of Q3 after complete functionalisation and/or endcapping of silanol groups of the organo-modified silica based material to the amount of Q3 before functionalisation and/or endcapping of the organo-modified silica based material is suitably from about 0.01 to about 0.99, preferably from about 0.10 to about 0.95, most preferably from about 0.25 to about 0.90.

The pore size of the stationary phase separation material is suitably from about 20 to about 100% of the pore size of the silica based material (S), preferably from about 30 to about 95%, most preferably from about 40 to about 90%.

The pore volume of the stationary phase separation material is suitably from about 0.1 to about 4 ml/g, preferably from about 0.2 to about 2 ml/g, most preferably from about 0.3 to about 1.2 ml/g.

The specific surface area (BET method) of the stationary phase separation material is suitably from about 1 to about 1000 $m^2/g$, preferably from about 25 to about 700 $m^2/g$, most preferably from about 50 to about 500 $m^2/g$. The specific surface area (BET method) normally decreases when a material is being functionalised. Thus, a functionalised organo-modified silica based material normally has a lower specific surface area (BET method) than the organo-modified sililca based material itself.

The organo-modified silica based material and the stationary phase separation material have suitably a mechanical strength which is about equal to the silica based material (S).

The stability of the organo-modified silica based material and the stationary phase separation material in alkaline environments can be measured by packing the material in a column, pumping an alkaline solution through the column and determining the silicon content in the eluate (by elemental analysis). The alkaline stability of the organo-modified silica based material and the stationary phase separation material, preferably having a C18-, C8- or C4 functionalisation, determined as ppm silicon per specific surface area (BET method) [ppm $Si/m^2/g$] in the eluate from the procedure of pumping 41.5 mL of 10 mM NaOH mixed with ethanol in a 1:1 volume relation, at 1 mL/min, at a temperature of 25° C., through a column of 215 mm length and 4.6 mm inner diameter packed with about 2.5 g of the organo-modified silica based material, is suitably less than about 0.035 [ppm $Si/m^2/g$], or from about 0 to about 0.035 [ppm $Si/m^2/g$], preferably less than about 0.025 [ppm $Si/m^2/g$], or from about 0 to about 0.025 [ppm $Si/m^2/g$]. The alkaline stability of the organo-modified silica based material and the stationary phase separation material, preferably having a C18-, C8- or C4 functionalisation, determined as ppm silicon per specific surface area (BET method) [ppm $Si/m^2/g$] in the eluate from the procedure of pumping 41.5 mL of 100 mM NaOH mixed with ethanol in a 1:1 volume relation, at 1 mL/min, at a temperature of 25° C., through a column of 215 mm length and 4.6 mm inner diameter packed with about 2.5 g of the organo-modified silica based material, is suitably less than about 0.2 [ppm $Si/m^2/g$], or from about 0 to about 0.2 [ppm $Si/m^2/g$], preferably less than about 0.15 [ppm $Si/m^2/g$], or from about 0 to about 0.15 [ppm $Si/m^2/g$].

The method of preparing a stationary phase separation material comprises surface-functionalisation of the organo-modified silica based material according to the present invention by reacting the organo-modified silica based material with one or more functionalising agents comprising a functional group, such as diol-substituted alkyl, amino-substituted alkyl, cyanoalkyl, fluoroalkyl, phenyl, fluorophenyl, phenylalkyl, or $C_1$-$C_{30}$ alkyl, preferably $C_4$-, $C_8$-, and $C_{18}$ alkyl. Suitably, the functionalising agent is an organosilane comprising the functional group. Surface-functionalisation of silica is a well-known procedure and details about suitable procedures are described in, for example, *Silica Gel and Bonded Phases—Their Production, Properties and Use in L C. Raymond P. W Scott., John Wiley & Sons Ltd., 1993, England, UK*, p. 159-160. The surface-functionalisation is suitably made in a non-aqueous medium, e.g., toluene.

After reacting the organo-modified silica based material with the functionalising agent a step of end-capping is preferably made. As end-capping agent trimethylchlorosilane or dimethyldichlorosilane is preferably used.

The present invention further comprises the use of the stationary phase separation material in chromatographic separation methods. Such chromatographic separation methods can be, for example, HPLC, supercritical fluid chromatography (SFC), and simulating moving bed (SMB).

The present invention also relates to a packed separation column for chromatography comprising the stationary phase separation material of the present invention.

The present invention also relates to the preparation of a packed column for chromatography comprising a step of packing the stationary phase separation material according to the present invention in a column.

The present invention further comprises a method of separating chemical compounds from a mixture comprising contacting the mixture with the stationary phase separation material according to the present invention.

The present invention will now be described in the following examples, which, however, should not be interpreted as limiting the scope of the invention.

EXAMPLES

Example 1

Preparation of an Organo-modified Silica Based Material 21.50 mL methyltrimethoxysilane was added to 300 mL Milli-Q-water at room temperature. 30.00 g silica particles (Kromasil®), having an average particle size of 5 μm, an average pore size of 120 Å and a specific surface area of 320 $m^2/g$ was added and the mixture was heated to 95° C. The temperature was kept for 3 h. The temperature was thereafter lowered to 80° C. whereby 21 mL 25% $NH_{3(aq)}$ was added. The temperature was kept for 2 h. Thereafter, the temperature was lowered to room temperature and 21 mL 65% $HNO_{3(aq)}$ was added. The mixture was heated to 95° C. and this temperature was kept for 88 h after which the mixture was filtered and washed with Milli-Q-water, THF and acetone. The material was finally dried at 90° C. for 4 h.

The carbon content was measured by elemental analysis to 3.9 weight %.

Example 2

Preparation of an Organo-modified Silica Based Material 40.5 mL (33-36) ethyltrimethoxysilane was added to 500 mL Milli-Q-water having 50 g silica particles (Kromasil® 100 Å), having an average particle size of 5 μm, an average pore size of 120 Å and a specific surface area of 320 m²/g. The mixture was heated to 98° C. and the temperature was kept for 16 h. The temperature was cooled to below 40° C., filtered and washed with Milli-Q-water and acetone. The material was dried at 90° C. for 4 h.

The carbon content was measured by elemental analysis to 7.1 weight %.

Example 3

Preparation of an Organo-modified Silica Based Material

The product of Example 2 was dispersed in Milli-Q-water and the mixture was put in an autoclave. The temperature was raised to 130° C. and kept for 72 hours. The temperature was then cooled to below 40° C., filtered and washed with Milli-Q-water and acetone. The material was dried at 90° C. for 4 h.

The carbon content was measured by elemental analysis to 7.1 weight %.

Example 4

Preparation of Stationary Phase Separation Material

The organo-modified silica based materials prepared according to Example 1 was subjected to functionalisation into a C18-phase using dimethyl-octadecylchlorosilane employing standard procedures (i. e. using an amino-based catalyst in toluene). After functionalisation, the resulting phase was was endcapped using trimethylchlorosilane.

The carbon content from the C18-functionality was determined to 8.6 weight %.

Example 5

Preparation of Stationary Phase Separation Material

The organo-modified silica based materials prepared according to Example 3 was functionalised in the same way as described in Example 4.

The carbon content from the C18-functionality was determined to 7.3 weight %.

Examples 6-14

Preparation of Organo-modified Silica Based Materials

Further organo-modified silica based materials were made according to Example 2 and Example 3, using between 30 and 40 mL or organosilanes, and the same amounts of other components. As organosilanes were used methyltrimethoxysilane, methyltriethoxysilane, ethyltrimethoxysilane, propyltrimethoxy-silane, and bis(triethoxysilyl) ethane. The resulting materials were in some cases subjected to a C18-functionalisation in the same manner as described in Example 4. The C18 functionalising agent was either dimethyl-octadecylchlorosilane ("C18") or methyl-octadecyldichlorosilane ("di-C18"). Table 1 summarises the components used, their amount and if the autoclavation step according to Example 3 has been used or not.

TABLE 1

| Example | Organosilane | Autoclavation | Carbon content in organo-modified material [%] | Functionalisation |
|---|---|---|---|---|
| 6 | methyltrimethoxy-silane | no | 2.9 | C18 |
| 7 | methyltrimethoxy-silane | yes | 3.1 | C18 |
| 8 | ethyltrimethoxy-silane | no | 6.9 | — |
| 9 | ethyltrimethoxy-silane | no | 6.9 | C18 |
| 10 | ethyltrimethoxy-silane | yes | 7.2 | — |
| 11 | ethyltrimethoxy-silane | yes | 7.2 | C18 |
| 12 | bis(triethoxysilyl) ethane | yes | 2.6 | — |
| 13 | bis(triethoxysilyl) ethane | yes | 2.6 | C18 |
| 14 | propyltrimethoxy-silane | yes | 6.4 | C18 |

Example 15

Chemical Stability Test of the Stationary Phase Separation Material

Columns having a size of 250*4.6 mm were packed with about 2.5 g of the stationary phase separation materials prepared according to Examples 4 and 6. As a reference another column was packed with a conventional C18 phase (Kromasil 100-5-C18) which comprises C18-functionalised silica particles.

In a HPLC equipment acetonitrile/50 mM HOAc-NEt$_3$ 50:50 was used as a mobile phase. The pH was 12. The flow rate was 1 mL/min during analysis and 0.1 mL/min inbetween. The temperature was 25° C. The analytes toluene, nortriptyline, imipramine and amitriptyline were tested at regular intervals.

The capacity factor, k', which is a measurement of the relative retention behaviour was determined for all analytes.

Tables 2 to 4 show the results. Δk'/Δt is the change of k' over the latest 40 minutes.

TABLE 2

Stationary phase according to the invention (Example 2)

| Time (h) | k' toluene | Δk'/Δt | k' nortriptyline | Δk'/Δt | K' imipramine | Δk'/Δt | k' amitriptyline | Δk'/Δt |
|---|---|---|---|---|---|---|---|---|
| 0 | 7.62 | — | 12.15 | — | 19.55 | — | 24.58 | — |
| 40 | 7.74 | 0.003 | 13.76 | 0.040 | 20.96 | 0.035 | 26.33 | 0.044 |
| 80 | 7.68 | −0.0015 | 14.09 | 0.0082 | 21.16 | 0.0050 | 26.56 | 0.0058 |
| 120 | 7.66 | −0.0005 | 14.26 | 0.0042 | 21.25 | 0.0022 | 26.68 | 0.0030 |

TABLE 3

Stationary phase according to the invention (Example 5)

| Time (h) | k' toluene | Δk'/Δt | k' nortriptyline | Δk'/Δt | K' imipramine | Δk'/Δt | k' amitriptyline | Δk'/Δt |
|---|---|---|---|---|---|---|---|---|
| 0 | 7.22 | — | 11.41 | — | 18.92 | — | 23.73 | — |
| 40 | 7.37 | −0.0038 | 13.42 | 0.050 | 20.90 | 0.050 | 26.21 | 0.062 |
| 80 | 7.36 | −0.0002 | 13.78 | 0.0090 | 21.13 | 0.025 | 26.55 | 0.0085 |
| 120 | 7.33 | −0.0008 | 14.00 | 0.0055 | 21.31 | 0.0045 | 26.77 | 0.0055 |

TABLE 4

Conventional C18-phase (Kromasil)

| Time (h) | k' toluene | Δk'/Δt | k' nortriptyline | Δk'/Δt | K' imipramine | Δk'/Δt | k' amitriptyline | Δk'/Δt |
|---|---|---|---|---|---|---|---|---|
| 0 | 8.45 | — | 15.22 | — | 25.18 | — | 32.67 | — |
| 40 | 8.61 | 0.0040 | 19.94 | 0.12 | 27.76 | 0.064 | 35.89 | 0.080 |
| 80 | 8.61 | 0 | 21.69 | 0.044 | 28.49 | 0.018 | 36.69 | 0.020 |
| 120 | 8.62 | 0.0002 | 22.88 | 0.030 | 29.07 | 0.014 | 37.37 | 0.017 |

For the conventional C18 phase, the results show that for toluene, which only interacts significantly with the hydrophobic C18 functionality, there is no deterioration of the C18 functionality over time. However, the results for the other analytes, which also interact with hydrophilic structures such as silanol groups, show that there is an increased interaction over time which indicates a deterioration process at the silica surface. For the C18 phases according to the present invention, the C18 functionality is deteriorating to a much lesser degree than for a conventional C18-phase. Thus, the chemical stability of a C18 phase according to the present invention is significant higher than for a conventional C18 phase.

Example 16

Chemical Stability Test of the Stationary Phase Separation Material

Columns having a size of 250*4.6 mm were each packed with about 2.5 g of the stationary phase separation material prepared according to Examples 7, 8, 10, 12, 13, and 15. As a reference a column was packed with a conventional C18 phase (Kromasil 100-5-C18) which comprises C18-functionalised silica particles.

In a HPLC equipment the analytes nortriptyline and amitriptyline were tested using a 25 mM K-PO4-buffer (pH 6)/methanol 50:50 as a mobile phase. The flow rate was 1 mL/min and the temperature was 25° C. The capacity factor, k', which is a measurement of the relative retention behaviour was determined for each analyte.

The column was thereafter subjected to 0.1 M NaOH (aq)/ethanol 50:50 for five hours. After equilibration of the column, the capacity factors were determined again for the analytes using the same conditions as before.

The change in capacity factor is illustrated in table 5.

TABLE 5

| | nortriptyline | | | amitriptyline | | |
|---|---|---|---|---|---|---|
| Phase | k' before | k' after | % change | k' before | k' after | % change |
| Conventional C18-phase | 1.08 | 5.73 | +433 | 4.46 | 10.89 | +144 |
| The invention (Example 7) | 0.91 | 4.46 | +392 | 3.77 | 6.57 | +74 |
| The invention (Example 8) | 0.89 | 1.74 | +95 | 3.37 | 3.92 | +16 |
| The invention (Example 9) | 0.84 | 3.30 | +292 | 3.57 | 5.79 | +62 |
| The invention (Example 11) | 0.77 | 1.27 | +64 | 3.06 | 3.37 | +10 |
| The invention (Example 13) | 1.33 | 3.46 | +160 | 5.08 | 6.62 | +30 |
| The invention (Example 14) | 0.91 | 1.96 | +115 | 3.75 | 4.70 | +25 |

It is concluded that the materials according to the present invention give better results in terms of stability of capacity factor in alkaline conditions than a conventional C18-phase.

Example 17

Chemical Stability of the Stationary Phase Separation Material as Leakage of Silicon 2.5 g each of three batches of stationary phase separation materials all made according to combined Examples 2 and 3 (ethyl-modified, autoclave treated) and functionalised with methyl-octadecyldichlorosilane, according to the procedure in Example 4, were each packed in three columns of 215 mm length and 4.6 mm inner diameter. The specific surface area of the materials were each about 140 m$^2$/g. 41.5 mL of 10 mM NaOH mixed with ethanol in a 1:1 volume relation was pumped at 1 mL/min, at a temperature of 25° C., through each column. The silicon content was determined in the eluates by elemental analysis. A column packed with a conventional C-18 modified stationary phase was also provided. The procedure was repeated by pumping 10 mM NaOH:ethanol in a 1:1 volume relation and 100 mM NaOH:ethanol in a 1:1 volume relation through fresh columns respectively. Table 6 shows the results.

TABLE 6

| | Silicon content in eluate | |
|---|---|---|
| | Concentration of NaOH solution [mM] | |
| Column content | 10 | 100 |
| Material according to the invention Batch 1 | 0.016 [ppm Si/m$^2$/g] | 0.098 [ppm Si/m$^2$/g] |
| Material according to the invention Batch 2 | 0.015 [ppm Si/m$^2$/g] | 0.13 [ppm Si/m$^2$/g] |
| Material according to the invention Batch 3 | 0.016 [ppm Si/m$^2$/g] | 0.13 [ppm Si/m$^2$/g] |
| Conventional C18-material | 0.039 [ppm Si/m$^2$/g] | 0.21 [ppm Si/m$^2$/g] |

It is concluded that the material of the present invention exhibits a much higher stability to strong alkaline solutions than a conventional C18-phase. The stability is also reproducible between different batches.

Example 18

Mechanical Stability of the Stationary Phase Separation Material

The mechanical stability of porous silica particles is measured by packing about 25 mm of silica particles in a column having an inner diameter of 50 mm, using a pressure of 40 bar. A mobile phase is pumped through the column and the back-pressure which is needed to be exceeded in order to move the mobile phase through the column is determined. The silica particles are thereafter subjected to a pressure of 60, 80, 100, 120, 150, 200, 250, and 300 bar, wherein the back-pressure is measured at each piston pressure. The pressure increase [%] to 40 bar, at each piston pressure, is determined.

The mechanical stability of an organo-modified silica based material prepared according to Example 3 (ethyl-modified) was determined by the method described. As comparison, a conventional material (Kromasil C4) being C4-functionalised on (pure) bare silica was tested.

The results are shown in table 7.

TABLE 7

| | Pressure increase (%) | |
|---|---|---|
| Piston pressure | Material of the invention (example 3) | Conventional C4-phase (Kromasil C4) |
| 40 | 0 | 0 |
| 60 | 3.3 | 8.3 |
| 80 | 9.9 | 13.9 |
| 100 | 16.5 | 22.2 |
| 120 | 19.8 | 30.6 |
| 150 | 27.5 | 38.9 |
| 200 | 40.7 | 44.4 |
| 250 | 54.9 | 69.4 |
| 300 | 65.9 | 108.3 |

It is concluded that an organo-modified silica based material of the present invention has excellent mechanical stability.

Example 19

Control of Functionalisation Degree

Figure 4:
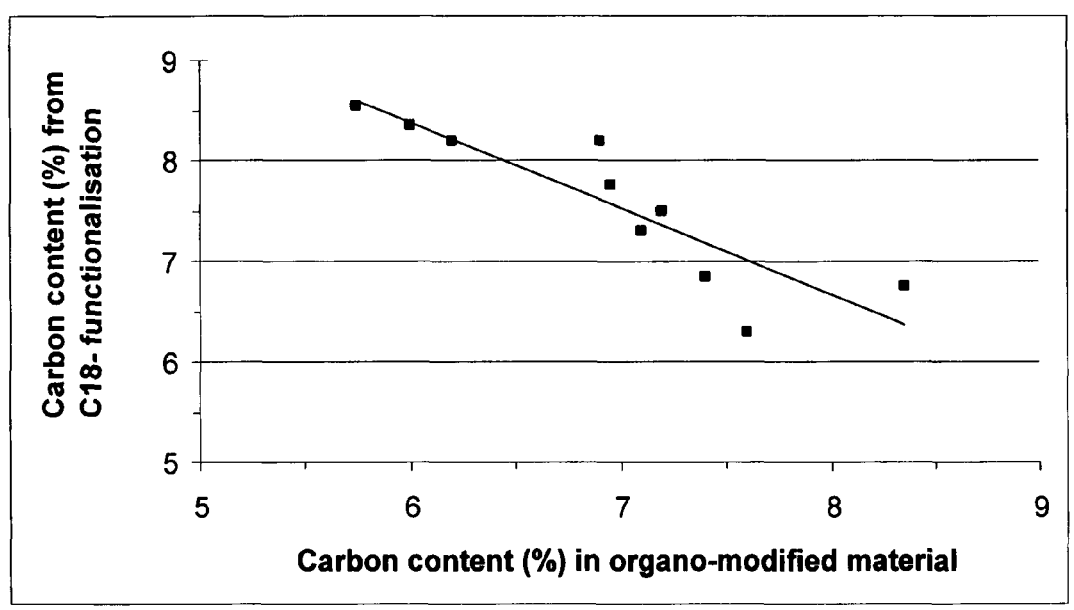
FIG. 4 is a graph showing the relationship between carbon content in organo-modified silica base materials and in the C18-functionalised phases.

Organo-modified silica based materials were prepared according to the method of combined Examples 2 and 3, varying the amount of organosilane (ethyltrimethoxy silane). A C18-functionalisation was then following the procedure in Example 4. Remaining silanols were endcapped with trimethoxy silane. The carbon contents in the organo-modified silica based materials and in the C18-functionalised phases were determined. The relation is shown in FIG. 4.

It is concluded that there is a clear relation between the carbon content in a organo-modified silica based material and the carbon content in the same material as functionalised. The relation is shown in FIG. 4. This relation makes it possible to effectively control the functionalisation degree.

The invention claimed is:

1. Stationary phase separation material comprising an organo-modified silica based material comprising an inner part which is unmodified silica, and a part which is silica comprising organic groups bonded to the silica, wherein said organic groups are distributed from the surface of the silica based material, including pore surfaces, into the silica based material in a gradually decreasing concentration, which further comprises a surface-functionalisation of the organo-modified silica based material in the form of one or more functional groups groups selected from the group consisting of diol-substituted alkyl, amino-substituted alkyl, cyanoalkyl, fluoralkyl, phenyl, fluorophenyl, phenylalkyl, $C_1$-$C_{30}$ alkyl, and combinations thereof;
   wherein the ratio of the amount of silicon atoms having a T2 structure to the amount of silicon atoms having a T3 structure is less than about 1, as determined by solid state NMR spectroscopy.

2. Stationary phase separation material according to claim 1, wherein the ratio of the amount of T3 to the amount of all of (T1+T2+T3) in the stationary phase separation material is more than, or equal to, about 0.70, as determined by solid state NMR spectroscopy.

3. Stationary phase separation material according to claim 1, having an alkaline stability, determined as ppm silicon per specific surface area (BET method) [ppm Si/m$^2$/g] in the eluate from the procedure of pumping 41.5 mL of 100 mM NaOH mixed with ethanol in a 1:1 volume relation, at 1 mL/min, at a temperature of 25° C., through a column of 215 mm length and 4.6 mm inner diameter packed with about 2.5 g of the organo-modified silica based material, of less than about 0.2 [ppm Si/m²/g].

4. Stationary phase separation material according to claim 1, wherein the surface-functionalisation in the form of one or more functional groups is selected from the group consisting of $C_4$-alkyl, $C_8$-alkyl, $C_{18}$-alkyl, and mixtures thereof.

5. Stationary phase separation material according to claim 1, wherein said organic groups are selected from the group consisting of alkyl groups, alkenyl groups, alkynyl groups, alkylene groups, alkenylene groups, alkynylene groups and mixtures thereof.

6. Stationary phase separation material according to claim 1, wherein the ratio of the amount of silicon atoms having a T2 structure to the amount of all of (T1+T2+T3) is less than about 0.40, as determined by solid state NMR spectroscopy.

7. Stationary phase separation material according to claim 1, wherein the ratio of the amount of silicon atoms having a T1 structure to the amount of all of (T1+T2+T3) in the stationary phase separation material, as determined by solid state NMR spectroscopy, is from about 0 to about 0.05.

8. The stationary phase separation material according to claim 1, wherein the ratio of the amount of T3 to the amount of all of (T1+T2+T3) in the stationary phase separation material is more than, or equal to, about 0.70, as determined by solid state NMR spectroscopy; and
wherein the stationary phase separation material has an alkaline stability, determined as ppm silicon per specific surface area (BET method) [ppm Si/m2/g] in the eluate from the procedure of pumping 41.5 mL of 100 mM NaOH mixed with ethanol in a 1:1 volume relation, at 1 mL/min, at a temperature of 25° C., through a column of 215 mm length and 4.6 mm inner diameter packed with about 2.5 g of the organo-modified silica based material, of less than about 0.2 [ppm Si/m2/g].

9. Stationary phase separation material comprising an organo-modified silica based material comprising an inner part which is unmodified silica, and a part which is silica comprising organic groups bonded to the silica, wherein said organic groups are distributed from the surface of the silica based material, including pore surfaces, into the silica based material in a gradually decreasing concentration, which further comprises a surface-functionalisation of the organo-modified silica based material in the form of one or more functional groups, and wherein the stationary phase separation material has an alkaline stability, determined as ppm silicon per specific surface area (BET method) [ppm Si/m²/g] in the eluate from the procedure of pumping 41.5 mL of 100 mM NaOH mixed with ethanol in a 1:1 volume relation, at 1 mL/min, at a temperature of 25° C., through a column of 215 mm length and 4.6 mm inner diameter packed with about 2.5 g of the organo-modified silica based material, of less than about 0.2 [ppm Si/m²/g] wherein the ratio of the amount of silicon atoms having a T2 structure to the amount of silicon atoms having a T3 structure is less than about 1, as determined by solid state NMR spectroscopy.

10. Stationary phase separation material according to claim 9, wherein the surface-functionalisation in the form of one or more functional groups is selected from the group consisting of diol-substituted alkyl, amino-substituted alkyl, cyanoalkyl, fluoralkyl, phenyl, fluorophenyl, phenylalkyl, $C_1$-$C_{30}$ alkyl, and mixtures thereof.

11. Stationary phase separation material according to claim 10, wherein the surface-functionalisation in the form of one or more functional groups is selected from the group consisting of $C_4$-alkyl, $C_8$-alkyl, $C_{18}$-alkyl, and mixtures thereof.

12. Stationary phase separation material according to claim 10, wherein the surface-functionalisation in the form of one or more functional groups is selected from the group consisting of diol-substituted alkyl, amino-substituted alkyl, cyanoalkyl, fluoralkyl, phenyl, fluorophenyl, phenylalkyl, and mixtures thereof.

13. Stationary phase separation material comprising an organo-modified silica based material comprising an inner part which is unmodified silica, and a part which is silica comprising organic groups bonded to the silica, wherein said organic groups are distributed from the surface of the silica based material, including pore surfaces, into the silica based material in a gradually decreasing concentration, which further comprises that the organo-modified silica based material has been subjected to (i) surface-functionalisation and (ii) end-capping wherein the ratio of the amount of silicon atoms having a T2 structure to the amount of silicon atoms having a T3 structure is less than about 1, as determined by solid state NMR spectroscopy.

14. Stationary phase separation material according to claim 13, wherein the surface-functionalisation is achieved by reaction of silanol groups of the organo-modified silica based material with one or more organosilanes comprising a functional group.

15. Stationary phase separation material according to claim 14, wherein the functional group is selected from the group consisting of diol-substituted alkyl, amino-substituted alkyl, cyanoalkyl, fluoralkyl, phenyl, fluorophenyl, phenylalkyl, $C_1$-$C_{30}$ alkyl, and mixtures thereof.

16. Stationary phase separation material according to claim 15, wherein the functional group is selected from the group consisting of $C_4$-alkyl, $C_8$-alkyl, $C_{18}$-alkyl, and mixtures thereof.

17. Stationary phase separation material according to claim 13, wherein the end-capping is achieved by reaction of silanol groups of the organo-modified silica based material with an end-capping agent.

18. Stationary phase separation material according to claim 17, wherein end-capping agent is selected from the group consisting of trimethyl chlorosilane, dimethyl dichlorosilane, and mixtures thereof.

* * * * *